United States Patent
Schroeder et al.

(10) Patent No.: US 9,537,301 B1
(45) Date of Patent: Jan. 3, 2017

(54) SYSTEM AND METHOD FOR GENERATOR BRAKING

(71) Applicant: GENERAL ELECTRIC COMPANY, Schenectady, NY (US)

(72) Inventors: Stefan Schroeder, Munich (DE); Mikhail Avramovich Avanesov, Unterschleissheim (DE); Ara Panosyan, Munich (DE); Christoph Boeld, Munich (DE); Herbert Schaumberger, Muenster (AT); Uwe Liebscher, Kufstein (AT)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/821,427

(22) Filed: Aug. 7, 2015

(51) Int. Cl.
| | | |
|---|---|---|
| *F02D 29/06* | (2006.01) | |
| *F03B 13/10* | (2006.01) | |
| *F03B 15/08* | (2006.01) | |
| *H02P 9/04* | (2006.01) | |
| *H02H 7/06* | (2006.01) | |
| *H02K 49/04* | (2006.01) | |
| *H02P 3/04* | (2006.01) | |
| *H02P 9/06* | (2006.01) | |
| *H02K 7/18* | (2006.01) | |

(Continued)

(52) U.S. Cl.
CPC ............ *H02H 7/067* (2013.01); *H02K 7/1815* (2013.01); *H02K 49/04* (2013.01); *H02P 3/04* (2013.01); *H02P 9/06* (2013.01)

(58) Field of Classification Search
USPC ............... 290/7; 187/296; 310/105; 318/816
See application file for complete search history.

(56) References Cited

U.S. PATENT DOCUMENTS

| | | |
|---|---|---|
| 3,201,674 A | 8/1965 | Wada |
| 3,439,249 A | 4/1969 | Brendemuehl |
| 3,838,323 A | 9/1974 | Anderson |

(Continued)

FOREIGN PATENT DOCUMENTS

| | | |
|---|---|---|
| CN | 102537150 A | 7/2012 |
| JP | 4460930 B2 | 5/2010 |
| KR | 101171638 B1 | 8/2012 |

OTHER PUBLICATIONS

Wu et al., Analysis of Eddy Current Force in Electromagnetic Aircraft Launch System, Journal of National University of Defense Technology, May 2011, Changsha, CN.

(Continued)

*Primary Examiner* — Pedro J Cuevas
(74) *Attorney, Agent, or Firm* — Ann M. Agosti

(57) ABSTRACT

A system including an electromagnetic braking system that has an eddy current brake. The eddy current brake includes an electrically conductive surface coupled to a shaft of a generator system, wherein the eddy current brake is configured to induce an electromagnetic force on the electrically conductive surface when powered. The electromagnetic braking system further includes a supercapacitor coupled to the eddy current brake, wherein the supercapacitor is configured to discharge to power the eddy current brake for the duration of a ride through event of the generator system, and the supercapacitor is configured to supply a threshold current to the eddy current brake within approximately 100 ms of a start of the ride through event.

20 Claims, 4 Drawing Sheets

(51) Int. Cl.
 *H02K 49/02* (2006.01)
 *H02P 15/00* (2006.01)

(56) References Cited

U.S. PATENT DOCUMENTS

| | | | |
|---|---|---|---|
| 4,374,352 A | 2/1983 | Webster | |
| 4,493,398 A * | 1/1985 | Kindler | B66B 1/28 187/296 |
| 4,503,937 A * | 3/1985 | Cervenec | B66B 1/285 187/296 |
| 4,765,315 A * | 8/1988 | Krukowski | A63B 21/0056 482/5 |
| 4,812,728 A | 3/1989 | Yang | |
| 4,853,573 A | 8/1989 | Wolcott et al. | |
| 4,987,977 A * | 1/1991 | Nomura | B66B 1/32 187/288 |
| 5,149,998 A | 9/1992 | Wolcott | |
| 5,485,405 A * | 1/1996 | Wilson | G01C 21/16 701/505 |
| 5,821,712 A | 10/1998 | Fittje | |
| 8,026,647 B2 | 9/2011 | Seo | |
| 8,360,209 B2 * | 1/2013 | Roberts | B66B 1/40 187/291 |
| 2002/0089244 A1 * | 7/2002 | Liang | H02K 9/22 310/64 |
| 2002/0135258 A1 | 9/2002 | Drecq et al. | |
| 2014/0001756 A1 | 1/2014 | Panosyan et al. | |
| 2014/0333268 A1 | 11/2014 | Schroeder et al. | |
| 2015/0061298 A1 | 3/2015 | Panosyan et al. | |
| 2015/0097371 A1 | 4/2015 | Panosyan et al. | |

OTHER PUBLICATIONS

Yu et al., Maximum Force Control of a Linear Induction Motor Drive, Industrial Electronics Society, 33rd Annual Conference of the IEEE Industrial Electronics Society, Nov. 5-8, 2007, pp. 1091-1096, Taipei, Taiwan.

\* cited by examiner

SYSTEM AND METHOD FOR GENERATOR BRAKING

BACKGROUND

The subject matter disclosed herein relates generally to a power generation system and more specifically to electromagnetic braking of a generator of the power generation system during a low voltage ride through (LVRT) event.

A power grid collects power generated from multiple generators and transmits the power to different locations. During operation, grid disturbances may occur, which may be due to faults and decrease the voltage in a utility system. A sudden reduction in voltage at the point of interconnection of a generator and the grid may result in a sudden reduction of the electrical power output of the generator. As a consequence, there may be a greater mechanical power input from an engine coupled to the generator compared to the electrical power output of the generator. This may cause the rotational speed of the generator to accelerate, leading to a loss of synchronism between the generator and the grid. Moreover, disconnecting the generator may reduce the stability of the grid.

As a result, some grid codes specify that generators "ride through" certain voltage conditions caused by grid fault events. As may be appreciated, the phrase "ride through" as utilized herein may be defined as to continue operating without disconnecting from the grid. This capability is referred to as an LVRT or fault ride through (FRT). Various types of loads may be applied to the generator to reduce the difference in mechanical input and electrical output from the generator. Unfortunately, known electromagnetic braking systems utilize multiple components (e.g., batteries, capacitors, chargers) and have high maintenance costs associated with batteries.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes an electromagnetic braking system that has an eddy current brake. The eddy current brake includes an electrically conductive surface coupled to a shaft of a generator system, wherein the eddy current brake is configured to induce an electromagnetic force on the electrically conductive surface when powered. The electromagnetic braking system further includes a supercapacitor coupled to the eddy current brake, wherein the supercapacitor is configured to discharge to power the eddy current brake for the duration of a ride through event of the generator system, and the supercapacitor is configured to supply a threshold current to the eddy current brake within approximately 100 ms of a start of the ride through event.

In another embodiment, a system includes a controller coupled to a power generation system and an electromagnetic braking system, wherein the controller is configured to determine a start of a ride through event based at least in part on a load parameter of the power generation system. The controller is configured to discharge a supercapacitor within a threshold time period of the start to drive the electromagnetic brake to load the power generation system. The controller is configured to discharge the supercapacitor for a duration of the ride through event.

In yet another embodiment, a method includes monitoring a load parameter of the power generation system, determining a start of a ride through event based at least in part on a first change to the load parameter, and applying an eddy current brake to load the power generation system through the ride through event. The step of applying the eddy current brake includes discharging a supercapacitor within a threshold time period of the start of the ride through event, wherein discharging the supercapacitor comprises supplying current from the supercapacitor to the eddy current brake. The step of applying the eddy current brake also includes inducing, via the current through at least one coil, an electromagnetic force on an electrically conductive surface of the power generation system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
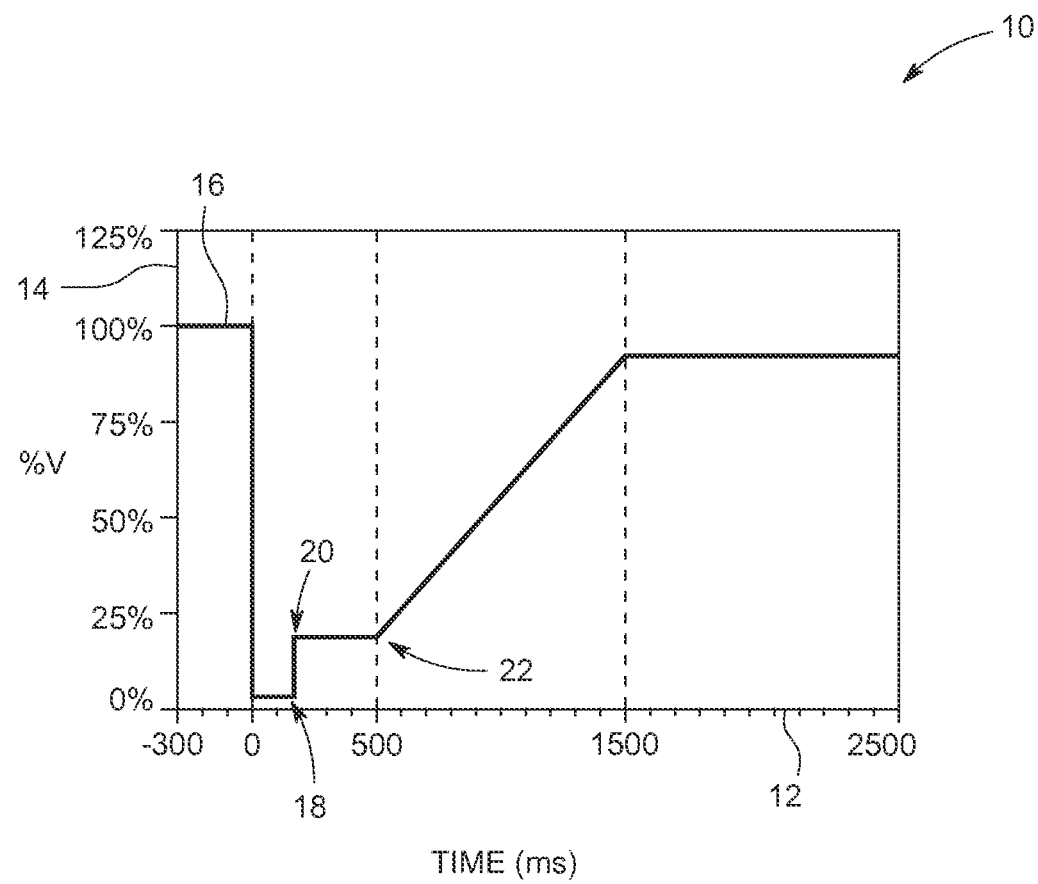
FIG. 1 illustrates a plot of a voltage limit curve at the point of connection of a power generation system to a grid during an LVRT event.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

It is desirable for generators, such as distributed energy resource (DER) systems, to remain synchronized to a power grid, "ride through" low voltage fault conditions, and feed power into the grid immediately after the fault is cleared due to grid codes enforcing such restrictions. DER systems are small generators, typically in a range from 3 kW to 10,000 kW, that generate power from various sources and transfer the generated power to the connected power grid. DER systems are typically an alternative or enhancement to traditional electric power systems. DER systems reduce the amount of energy lost in transmitting electricity because the electricity is generated very close to where it is used. As may be appreciated, the phrase "ride through" as utilized herein may be defined as to continue operating without disconnecting from the grid. This capability is referred to as low voltage ride through (LVRT) or fault ride through (FRT). As will be described in detail hereinafter, various embodiments of systems and methods for electromagnetic braking of a power generator during an LVRT event and maintaining synchronism with the grid are presented. These various embodiments rapidly control a rotational speed of a shaft of a power generation system within a desired time period and control the rotational speed for a desired duration, which in turn provides effective ride through capabilities in the power generation system, by using a supercapacitor to power an electromagnetic brake. As discussed further below, the power density of the supercapacitor would help to reduce the response time of the electromagnetic brake powered by the supercapacitor, as compared to conventional batteries. Moreover, the maintenance costs associated with supercapacitors may be less than with conventional batteries. Additionally, the energy density of the supercapacitor increases the braking duration of the electromagnetic brake relative to using capacitors alone. Supercapacitors are attractive storage elements with the aforementioned features of combined high power and energy density and low maintenance effort. Other existing or future electrical storage elements with similar characteristics are within the spirit of the invention.

FIG. 1 illustrates a plot 10 of a voltage limit curve at the point of connection (POC) of the power generation system to the grid during the LVRT event. For example, the LVRT event may be caused by lightning or wind storms knocking down or otherwise damaging transmission lines. These faults may cause a voltage decrease of a magnitude and duration, depending on the type and severity of the fault and the distance of the fault from the POC. Grid codes may specify that the generators remain connected if the voltage decrease is of a certain magnitude and duration at the POC. For example, grid codes may specify generators stay connected when the voltage decrease is between 70% and 100%, 80% and 95%, or 85% and 90%, and the duration is between 50 ms and 5 seconds, 100 ms and 4 seconds, or 150 ms and 3 seconds. Ensuring that generators stay connected to the grid prevents increasing the voltage decrease via disconnection, which could otherwise increase system instability.

The plot 10 shows a horizontal axis 12 representing time in milliseconds and a vertical axis 14 representing voltage in percentage of pre-LVRT event voltage (e.g., 400 V, 690 V). The LVRT event occurs at 0 ms. Before the LVRT event, the system is in a steady-state and the pre-LVRT event voltage 16 at the POC (i.e., before 0 ms) is 100% or 1 per unit. During steady-state, a prime mover of the power generation system, the shaft, and generator are synchronous with the grid. When the LVRT event occurs, the voltage 18 at 0 ms may drop down to as low as 5% of a steady-state voltage. In this example, the grid codes specify that the generator stay connected with the grid even when the voltage drops by 95%, to as low as 5%. It should be noted that the voltage at the POC is based at least in part on the electrical distance of the fault from the POC, the type and severity of the fault, and so forth. In some embodiments, the voltage decrease during the LVRT event may be between 70% and 100%, 80% and 95%, or 85% and 90%.

When the LVRT event occurs, as illustrated at 0 ms in FIG. 1, the amount of electrical power delivered by the generator into the grid typically decreases as well. If a mechanical power produced by the prime mover is not reduced, the mechanical power delivered to the generator by the prime mover exceeds the electrical power delivered by the generator into the grid. The difference in the mechanical power delivered to the generator and the electrical power taken out from the generator may be exhibited as acceleration of the prime mover, the shaft coupling the prime mover to the generator, and the generator. Increasing the speed of the generator above a synchronous speed may increase a generator rotor angle.

The generator rotor angle is the angle between the magnetic field of the generator rotor and the magnetic field produced in the stator coils of the generator. During normal (and synchronized) operation, the magnetic fields are nearly aligned (e.g., between 10° and 60° from full alignment), and the magnetic field of the rotor will advance with respect to magnetic field of the stator coils. The angle of the advancement of the magnetic field of the generator rotor with respect to the magnetic field of the stator coils is the rotor angle. If the LVRT event is long enough, the speed of the rotor of the generator will increase to the point that the rotor angle reaches 90°. If the rotor angle reaches 90°, synchronism of the rotor and generator is lost. The generator may not return to synchronism after the LVRT if the rotor angle reached 90° during the LVRT. If the generator is not disconnected from the grid when the rotor angle reaches 90°, the generator may output high transient current peaks to the POC. Continued operation, despite loss of synchronism, may result in the rotor experiencing a sudden physical and electrical shift in position relative to the stator, after which the field recovers enough strength to lock the rotor back in synch with the stator (known as pole slipping). The violent acceleration and deceleration associated with pole slipping causes enormous stress on the generator and prime mover, and may result in winding movement to shaft fracture.

If the generator loses synchronism with the grid, the generator will typically be disconnected from the grid so that it can be resynchronized and reconnected to the grid. However, disconnecting the generator from the grid may result in noncompliance with the grid code. Applying a braking force to the shaft to keep the generator rotor speed close to a synchronous speed or below a threshold speed may enable the generator to comply with the grid code. As may be appreciated, compliance with the grid code may facilitate maintaining synchronism between the generator and the POC, thereby enabling the generator to continue supplying power to the grid during and after the LVRT event.

In FIG. 1, the LVRT event duration 18 is shown as 150 ms. It is appreciated that the duration of the LVRT event can be a range of time. For example, the LVRT event duration could be between approximately 1 ms to 300 ms, 10 ms to 200 ms, or 50 ms to 150 ms. In this example, at 150 ms, the fault is cleared or a zone protection is activated 20, thus the voltage increases to 20% of the steady-state voltage. A zone protection is an isolation scheme of the grid that serves to detect and isolate a fault section of the grid such that the section continues operating without disabling the entire grid. Further at 500 ms, other zone protections are activated 22, thereby enabling the voltage to return to 90% steady-state voltage within 1500 ms.

Figure 2:
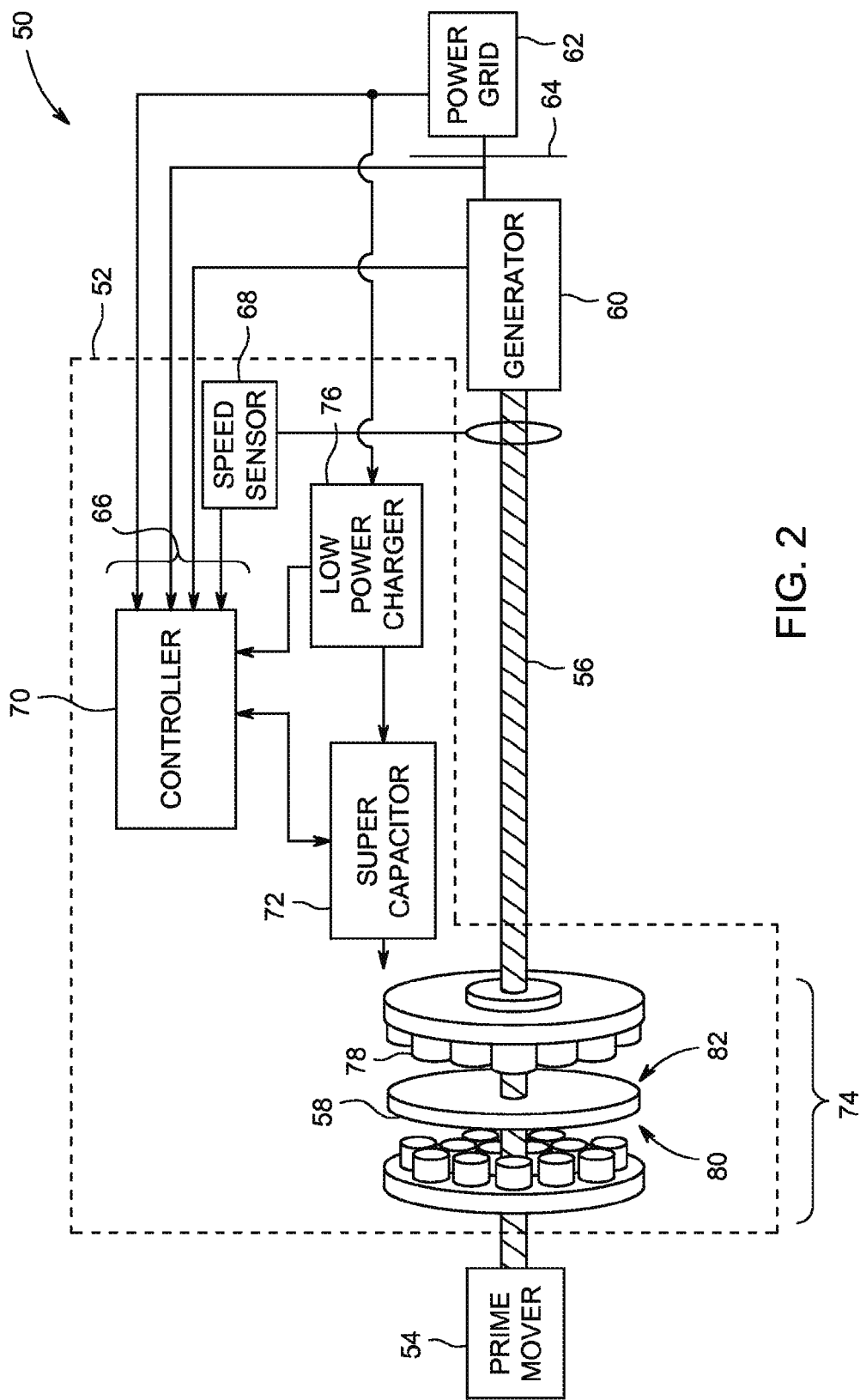
FIG. 2 is a block diagram of the power generation system including an embodiment of an electromagnetic braking system, in accordance with the present disclosure.

FIG. 2 is a block diagram of the power generation system 50 including an embodiment of an electromagnetic braking system 52, in accordance with the present disclosure. The power generation system 50 is typically used to convert mechanical power into electrical power. For example, in a wind system, the kinetic energy of wind passing across a wind turbine is converted into mechanical power. Other non-limiting examples of applicable power generation systems 50 include gas turbines, gas engines, diesel engines, and reciprocating engines. The converted mechanical power is in turn used to generate electrical power.

In the embodiment of FIG. 2, the power generation system 50 includes the prime mover 54, the shaft 56, the generator 60, and the electromagnetic braking system 52. The generator 60 provides electrical power to the grid 62. The prime mover 54 is mechanically coupled to the generator 60 through the shaft 56. The shaft 56 is typically used to convey the mechanical power from the prime mover 54 to the generator 60. For example, the mechanical power from the prime mover 54 may be used to rotate the shaft 56 at a predetermined speed during steady-state operation. This rotation of the shaft 56 in turn rotates the rotor of the generator 60 to generate electrical power.

Furthermore, the electrical power generated at the generator 60 is transferred to the grid 62. The POC 64 is the connection point of the generator 60 and the grid 62. The grid 62 collects the power generated from one or more generators and transmits the collected power to different locations for use.

During operation of the power generation system 50, the voltage at the POC 64 may decrease below a predetermined level, as depicted in FIG. 1, due to one or more LVRT events in the grid 62. As a result, the electrical power delivered to the grid 62 by the generator 60 to the grid 62 will likely be reduced. If the mechanical power delivered by the prime mover 54 to the generator 60 is not reduced accordingly, then the mechanical power surplus will accelerate the shaft of the prime mover 54 and the generator 60. Consequently, the rotor speed of the generator 60 may increase if the mechanical power delivered to the generator is not reduced, resulting in increase of the generator rotor angle and potential loss of synchronism between the generator 60 and the grid 62 as discussed above. Unless the mechanical power delivered by the prime mover 54 to the generator 60 is reduced, the generator 60 may be disconnected from the grid 62 and fail to comply with the grid code.

However, to ride through LVRT events and comply with the grid code, the electromagnetic braking system 52 is employed to help the power generation system 50 to maintain synchronism between the generator 60 and the grid 62 by controlling the rotational speed of the shaft 56. Particularly, the electromagnetic braking system 50 monitors one or more load parameters via inputs 66 of the power generation system 50. The one or more load parameters may include, but are not limited to the rotational speed of the shaft 56, a voltage in the grid 62, a current at the generator 60, the mechanical power produced by the prime mover 54, the rotor angle of the generator 60, or the electrical power produced by the generator 60, or any combination thereof. The one or more load parameters may also indicate one or more conditions, including LVRT events, in the power generation system 50 and/or the grid 62.

The electromagnetic braking system 52 may include a speed sensor 68, a controller 70, the supercapacitor 72, the electromagnetic brake (e.g., an eddy current brake 74), and a low power charger 76. The controller 70 may be configured to determine a start of the LVRT event based at least in part on a first change to the one or more load parameters received via the inputs 66. In some examples, the controller 70 may receive the input 66 of the load parameter representative of the voltage from the grid 62. At the start of the LVRT event, the voltage from the grid 62 decreases. The controller 70 determines the start of the LVRT event by determining whether the voltage from the grid 62 is below a threshold voltage based at least on the received input 66. For example, the controller 70 may be configured to determine the start of the LVRT event if the voltage from the grid 62 is not within approximately 10% of the steady-state voltage from the grid 62 prior to the LVRT event.

In some examples, the controller 70 receives the input 66 of the load parameter representative of the electrical power delivered to the grid 62 by the generator 60. At the start of the LVRT event, the amount of power delivered by the generator 60 into the grid 62 typically decreases. In this example, the controller 70 determines the start of the LVRT event by determining whether the electrical power produced by the generator 60 is below a threshold power based at least on the received input 66. For example, the controller 70 may be configured to determine the start of the LVRT event if the electrical power delivered to the grid 62 by the generator 60 is not within approximately 5% of a steady-state electrical power delivered to the grid 62 by the generator 60 prior to the LVRT event.

In some examples, the controller 70 receives the input 66 of the load parameter representative of the rotational speed from the speed sensor 68 produced by the shaft 56 and/or a mechanical power delivered by the prime mover 54 to the shaft 56. The speed sensor 68 may be electrically coupled to the shaft 56 to determine the rotational speed of the shaft 56. The controller 70 may monitor the input 66 representative of the rotational speed of the shaft 56 provided by the speed sensor 68. At the start of the LVRT event, the prime mover 54 may accelerate, resulting in the shaft 56 increasing in rotational speed and the surplus of mechanical power relative to the electrical power delivered to the grid 62 by the generator 60. In this example, the controller 70 determines the start of the LVRT event by determining whether the rotational speed of the shaft 56 is above the threshold rotational speed based at least on the received input 66 and/or the mechanical power delivered by the prime mover 54 to the shaft 56 is above a threshold power based at least on the received input 66. For example, the controller 70 may be configured to determine the start of the LVRT event if the rotational speed of the shaft 56 is not within approximately 5% of a steady-state rotational speed prior to the LVRT event and/or the mechanical power delivered by the prime mover 54 to the shaft 56 is not within approximately 5% of a steady-state mechanical power delivered by the prime mover 54 to the shaft 56 prior to the LVRT event.

In some examples, the controller 70 may receive the input 66 of the load parameter representative of the rotor angle of the generator 60. At the start of the LVRT event, the rotor angle of the generator 60 may increase while the mechanical power delivered to the generator 60 is greater than the electrical power delivered to the grid 62. In this example, the controller 70 determines the start of the LVRT event by determining whether the rotor angle of the generator 60 is above a threshold rotor angle based at least on the received input 66. The rotor angle may be estimated by using measurements from the terminals of the generator 60 and mathematical models. Alternatively, the rotor angle may be directly measured, for example, by using a rotary encoder on the shaft 56. The controller 70 may be configured to determine the start of the LVRT event if the rotor angle is not within approximately 10% of a steady-state rotor angle prior to the LVRT event.

In some examples, the controller 70 receives the input 66 of the load parameter representative of a current generated by the generator 60. At the start of the LVRT fault event, the current by the generator 60 into the grid 62 typically drops with the voltage. In this example, the controller 70 determines the start of the LVRT event by determining whether the current generated by the generator 60 is below a threshold current based at least on the received input 66. For example, the controller 70 may be configured to determine the start of the LVRT event if the current generated by the generator 60 is not within approximately 20% of a steady-state current generated by the generator 60 prior to the LVRT event.

Furthermore, in some examples, the controller 70 receives the one or more inputs 66 of the one or more load parameters representative of some combination of the rotational speed of the shaft 56, the mechanical power produced by the prime mover 54, the current generated by the generator 60, the voltage in the grid 62, the rotor angle of the generator 60, and the electrical power produced by the generator 60. In some examples, the controller 70 determines the start of the LVRT event when each of the following conditions is present: the voltage in the grid 62 is below the threshold voltage, the generator 60 current is above the threshold current, and the rotational speed of the shaft 56 is above the threshold speed. Otherwise, the controller 70 does not determine the start of the LVRT event. In some examples of combination approaches, the controller 70 determines that the start of the LVRT event when the voltage at the grid is below approximately 50% of the steady-state voltage prior to the LVRT event and the generator current is above approximately 110% of the steady-state current prior to the LVRT event.

The eddy current brake 74 may include an electrically conductive surface 58 that may be coupled to the shaft 56 of the power generation system 50. The conductive material used for the electrically conductive surface 58 (e.g., a disc) may include, but is not limited to copper, aluminum, steel, or any combination thereof. The electrically conductive surface 58 may be a small and light disc such that the disc itself has a negligible effect on the inertia of the generator 60. In some embodiments, the electrically conductive surface 58 may have a thickness of between approximately 0.1 cm and 5 cm, 0.5 cm and 3 cm, or 1 cm and 2 cm. In some embodiments, the electrically conductive surface 58 may have an outer diameter between approximately 40 cm to 140 cm, 60 cm to 120 cm, or 80 cm to 100 cm. It is to be noted that the dimensions of the electrically conductive surface 58 may vary depending on the type of application, and thus, they should not be intended as limited to the disclosed embodiments. Because the electrically conductive surface 58 is rigidly coupled to the shaft 56, the rotational speed of the shaft 56 may be controlled by controlling the rotational speed of the electrically conductive surface 58.

The eddy current brake 74 may also include inductors 78. The inductors 78 may include one or more electrical windings (e.g., coils) that are disposed proximate to the electrically conductive surface 58. Upon determining that the LVRT event started, the controller 70 may be configured to direct the electromagnetic braking force on the electrically conductive surface 58 (e.g., disc). "Proximate" as used herein means close enough to the electrically conductive surface 58 that the described electromagnetic braking function can be achieved. For example, the inductors 78 may be disposed within about 0.5 to 20 mm, 2.5 to 10 mm, or 3.5 to 6.5 mm of the electrically conductive surface 58. In some embodiments, the inductors 78 may be arranged in one or more layers facing the electrically conductive surface 58. However, the inductors 78 may also be arranged in one or more groups facing either one side 80 of the electrically conductive surface 58 or both the sides 80, 82 of the electrically conductive surface 58.

The one or more windings coupled to the supercapacitor 72. Building up current supplied by the supercapacitor 72 in the one or more windings of the eddy current brake 74 (i.e., magnetizing) may cause the inductors 78 to generate a first magnetic field. The supercapacitor 72 may be configured to discharge for the duration of the LVRT event without supplementary power from another source or concurrent recharging of the supercapacitor. That is, the supercapacitor 72 may be recharged after the conclusion of the LVRT event rather than during the LVRT event. As discussed above, the duration of the LVRT event can be a range of time. The supercapacitor 72 is sized to store sufficient electrical energy to drive the eddy current brake 74 for the LVRT duration. That is, where the eddy current brake 74 draws approximately 1 kW during operation, the supercapacitor 72 may store at least approximately 500 J (0.14 kWh) to drive the eddy current brake 74 for approximately 500 ms. In some embodiments, the supercapacitor 72 is configured to discharge for at least a threshold time period during the LVRT event while providing current to the one or more windings of the eddy current brake. For example, the supercapacitor 72 may be configured to discharge for between approximately 1 to 500 ms, 10 and 200 ms, or 50 and 150 ms during the LVRT event. Powering the eddy current brake 74 with an energy source that has a greater energy density enables the eddy current brake 74 to have a greater braking duration. Energy density is the amount of energy per unit volume that can be stored. A conventional capacitor has an energy density of 0.01 to 0.05 watt-hours per kilogram (Wh/kg). Driving the eddy current brake 74 solely with conventional capacitors for the entire LVRT event would be impractical and unduly costly because the eddy current brake 74 would be powered by a very large number of conventional capacitors. A conventional battery has a higher energy density of 8 to 600 Wh/kg. A supercapacitor has an energy density of 1 to 5 Wh/kg, in between that of a conventional capacitor and conventional battery.

Additionally, the supercapacitor 72 may be configured to supply a threshold current to the eddy current brake 74 within a threshold period of the start of the LVRT event. For example, the supercapacitor 72 may be configured to supply the threshold current of between approximately 70% to 95% of the final current value, which can be in the range of 100 A to 2000 A, to the eddy current brake 74. Moreover, for an eddy current brake 74 that has a braking power of approximately 1.5 MW, for example, the supercapacitor 72 may be configured to supply the threshold current to the eddy current brake 74 within approximately 100 ms, 50 ms, 30 ms, 20 ms, 10 ms, or 5 ms, or less, from determining the start of the LVRT event. The current values would approximately scale with the braking power of the eddy current brake 74.

The first magnetic field generated in the inductors 78 induces eddy currents inside the rotating electrically conductive surface 58, which produce a second magnetic field. The first magnetic field opposes the second magnetic field, thus resisting the rotation of the electrically conductive surface 58 to provide the braking force. By resisting the rotation of the electrically conductive surface 58, the rotational speed of the shaft 56 is controlled below the threshold speed to maintain synchronism between the generator 60 and the grid 62. In some examples, if the rotational speed of the shaft 56 is above the threshold speed, the electromagnetic braking system 52 applies the braking force to the shaft 56 via the electrically conductive surface 58 (e.g., disc) to maintain synchronism between the generator 60 and the grid 62. That is, the electromagnetic braking system 52 may maintain the rotational speed of the shaft 56 below the threshold speed, thereby enabling the generator 60 to maintain synchronism with the grid 62 in compliance with the grid code.

The braking response time of the electromagnetic braking system 52 affects the duration of acceleration of the shaft 56 rotation speed, and thereby affects the braking force exerted (and energy expended) to maintain synchronism of the generator 60 to the grid 62. As may be appreciated, decreasing the braking response time may decrease the duration of acceleration of the shaft 56 and may decrease the braking force used to control the rotational speed of the shaft 56. Decreasing the time it takes to generate the first magnetic field in the inductors 78 may decrease the braking response time. Decreasing the time it takes to magnetize the one or more windings of the inductors 78 may decrease the time it takes to generate the first magnetic field. By supplying the current in the one or more windings from an energy source that provides a greater power, the time it takes to magnetize the one or more windings of the inductors 78 may decrease. Accordingly, powering the eddy current brake 74 with an energy source that has a greater power density enables the eddy current brake 74 to have a faster response time. Power density is the amount of power (rate of energy transfer per time) per unit volume, and describes the speed at which energy can be delivered to the load. A conventional capacitor (e.g., electrolytic capacitor) has a power density of 0.25 to 10,000 kilowatts per kilogram (kW/kg). A conventional battery has a lower power density of 0.005 to 0.4 kW/kg. A supercapacitor has a power density of 10 to 100 kW/kg, in between that of a conventional capacitor and conventional battery. Additionally, the supercapacitor 72 may be charged to a significantly higher voltage than a minimum voltage used to operate the eddy current brake 74 for the duration of the LVRT. For example, for an eddy current brake 74 that has a braking power of approximately 1.5 MW, the minimum voltage used to operate the eddy current brake 74 for the duration of the LVRT may be 10 to 100 V. The supercapacitor 72 may be charged to a significantly higher voltage, such as 100 V to 1000 V. These values would approximately scale with the braking power of the eddy current brake 74. The higher voltage supplied by the supercapacitor 72 enables a higher power to be delivered to the one or more windings of the inductors 78 in order to allow a faster magnetization of the one or more windings of the inductors 78.

In view of the disclosed embodiments, it would be advantageous to use the supercapacitor 72 as the energy source for the eddy current brake 74 due to the combination of a desirable power density and a desirable energy density. That is, the supercapacitor 72 enables the supply of the threshold current to the eddy current brake 74 within the threshold period (e.g., less than approximately 100 ms) of the start of the LVRT event, and the supercapacitor 72 may supply the threshold current to the eddy current brake 74 for the duration of the LVRT event. Additionally, the charge and discharge process in a battery is a slow process that can degrade the chemical compounds inside the battery over repeated charge/discharge cycles. Even while not in use, the batteries may degrade in their performance over time. In contrast, supercapacitors may be recharged rapidly relative to conventional batteries, and supercapacitors may have a greater cycle durability and no-load lifetime than conventional batteries. Thus, the frequent replacement costs associated with replacing batteries enable supercapacitors to have lower maintenance costs.

In some embodiments, the controller 70 is configured to determine the end of the LVRT event based at least in part on a second change to the load parameter. In some examples, the controller 70 may receive the input 66 of the load parameter representative of the voltage from the grid 62. At the end of the LVRT event, the voltage from the grid 62 rises to near steady-state levels prior to the LVRT event. In this example, the controller 70 determines the end of the LVRT event by determining whether the voltage from the grid 62 is above the threshold voltage based at least on the received input 66. For example, the controller 70 may be configured to determine the end of the LVRT event if the voltage from the grid 62 is within approximately 10% of the steady-state voltage from the grid 62 prior to the LVRT event.

In some examples, the controller 70 receives the input 66 of the load parameter representative of the electrical power produced by the generator 60. At the end of the LVRT event, the amount of power delivered by the generator 60 into the grid 62 typically rises to near steady-state levels prior to the LVRT event. In this example, the controller 70 determines the end of the LVRT event by determining whether the electrical power produced by the generator 60 is above the threshold power based at least on the received input 66. For example, the controller 70 may be configured to determine the end of the LVRT event if the electrical power delivered to the grid 62 by the generator 60 is within approximately 10% of the steady-state electrical power delivered to the grid 62 by the generator 60 prior to the LVRT event.

In some examples, the controller 70 receives the input 66 of the load parameter representative of the rotational speed from the speed sensor 68 produced by the shaft 56 and/or the load parameter representative of the mechanical power delivered by the prime mover 54 to the shaft 56. At the end of the LVRT event, as a result of the controller 70 applying the electromagnetic braking system 52, the prime mover 54 may decelerate, resulting in the shaft 56 decreasing in rotational speed and the amount of mechanical power delivered by the prime mover 54 to the shaft 56 approaching the amount of electrical power delivered to the grid 62 by the generator 60. In this example, the controller 70 determines the end of the LVRT event by determining whether the rotational speed of the shaft 56 is below the threshold rotational speed based at least on the received input 66 and/or the mechanical power delivered by the prime mover 54 to the shaft 56 is below the threshold power based at least on the received input 66. For example, the controller 70 may be configured to determine the end of the LVRT event if the rotational speed of the shaft 56 is within approximately 5% of the steady-state rotational speed prior to the LVRT event and/or the mechanical power delivered by the prime mover 54 to the shaft 56 is within approximately 5% of the steady-state mechanical power delivered by the prime mover 54 to the shaft 56 prior to the LVRT event.

In some examples, the controller 70 may receive the input 66 of the load parameter representative of the rotor angle of the generator 60. At the end of the LVRT event, the rotor angle of the generator 60 may decrease as the mechanical power delivered to the generator 60 approaches the electrical power delivered to the grid 62. In this example, the controller 70 determines the start of the LVRT event by determining whether the rotor angle of the generator 60 is below a threshold rotor angle based at least on the received input 66. For example, the controller 70 may be configured to determine the start of the LVRT event if the rotor angle is not within approximately 10% of a steady-state rotor angle prior to the LVRT event.

In some examples, the controller 70 receives the input 66 of the load parameter representative of a current generated by the generator 60. At the end of the LVRT fault event, the current delivered by the generator 60 into the grid 62 typically rises to near steady-state levels with the voltage. In this example, the controller 70 determines the end of the LVRT event by determining whether the current generated by the generator 60 is above a threshold current based at least on the received input 66. For example, the controller 70 may be configured to determine the end of the LVRT event if the current generated by the generator 60 is within approximately 20% of the steady-state current generated by the generator 60 prior to the LVRT event.

Furthermore, in another example, the controller 70 receives the one or more inputs 66 of the one or more load parameters representative of some combination of the rotational speed of the shaft 56, the mechanical power produced by the prime mover 54, the current generated by the generator 60, a voltage in the grid 62, the rotor angle of the generator 60, and the electrical power produced by the generator 60. In some examples, the controller 70 determines the end of the LVRT event when each of the following conditions is present: the voltage in the grid 62 is above a threshold voltage, the generator 60 current is below a threshold current, and the rotational speed of the shaft 56 is below the threshold speed. Otherwise, the controller 70 does not determine the end of LVRT event has occurred. In another example of a combination approach, the controller 70 determines the end of the LVRT event when the voltage at the grid 62 is within approximately 10% of the steady-state voltage prior to the LVRT event and the generator current is within approximately 10% of the steady-state current prior to the LVRT event.

Upon determining that the LVRT event ended, the electromagnetic braking system 52 may recharge the supercapacitor 72. In the embodiment shown in FIG. 2, the low power charger 76 is coupled to the supercapacitor 72 and the controller 70. The low power charger 76 is configured to charge the supercapacitor 72 after the end of the LVRT event. The low power charger 76 may also be coupled to the grid 62 or generator 60, which may drive the low power charger 76 to recharge the supercapacitor 72. After determining that the LVRT event ended as described above, the controller 70 may control the low power charger 76 to recharge the supercapacitor 72. The low power charger 76 may also start charging when the grid 62 starts to supply voltage. Because the time period for re-charging is not critical, a simple and low cost charger with a low power rating may be used. For example, the low power charger 76 may provide approximately between 10 and 1000 W, 250 and 750 W, or 400 and 600 W of power.

In some embodiments, if the duration of the LVRT event is long, a secondary loading system may be engaged to load the power generation system 50 after the electromagnetic braking system 52 is engaged. Additionally, or in the alternative, the controller 70 may shut down the power generation system 50 after a threshold time period has elapsed since the start of the LVRT event. For example, if the duration of the LVRT event is greater than a threshold time period (i.e., a maximum LVRT event duration specified in the grid code), the secondary loading system may be engaged to load the power generation system 50 or the controller 70 may shut down the power generation system 50. In some embodiments, if the duration of the LVRT event is greater than approximately 0.5 seconds to 3 seconds, 0.75 seconds to 2.25 seconds, or 1 second to 2 seconds, the secondary loading system will be engaged to load the power generation system 50. Additionally or in the alternative, if the duration of the LVRT event is greater than approximately 0.5 seconds to 3 seconds, 0.75 seconds to 2.25 seconds, or 1 second to 2 seconds, the controller 70 will shut down the power generation system 50.

Figure 3:
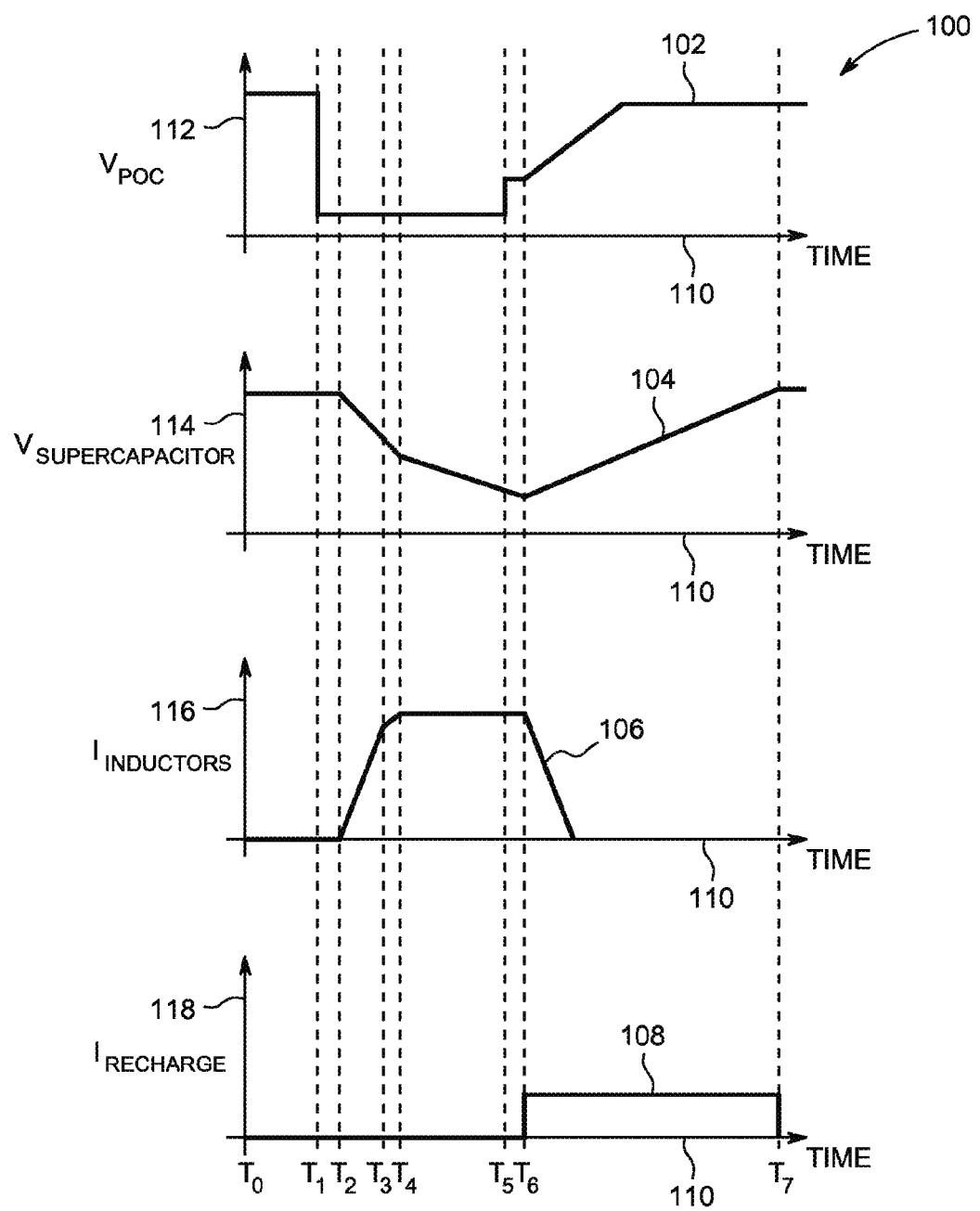
FIG. 3 illustrates plots of voltage and current signals in an embodiment of the electromagnetic braking system, in accordance with the present disclosure.

FIG. 3 illustrates four plots 100 of voltage and current signals in an embodiment of the electromagnetic braking system 50, in accordance with the present disclosure. For ease of understanding, the plots 100 are described with reference to the components of FIG. 2. The plots 100 include a POC voltage signal 102, a supercapacitor voltage signal 104, an inductor current signal 106, and a recharge current signal 108. The horizontal axis 110 for each of the four plots represent time. The POC voltage signal 102 of the first plot represents voltage 112 at the POC 64 of the power generation system 50 and the grid 62, similar to plot 10 shown in FIG. 1. The supercapacitor voltage signal 104 of the second plot represents voltage 114 across the supercapacitor 72. The inductor current signal 106 of the third plot represents electrical current 116 in the inductors 78 supplied by the supercapacitor 72. The recharge current signal 108 of the final plot represents electrical current 118 supplied by the low power charger 76 to recharge the supercapacitor 72.

FIG. 3 illustrates the power generation system 50 at the steady-state at time $T_0$. The supercapacitor voltage signal 102 is at maximum or peak level (meaning that the supercapacitor 72 is fully charged), and the inductor current signal 106 and the recharge current signal 108 are at zero levels. As may be appreciated, the supercapacitor 72 may not drive the eddy current brake 74 to slow the shaft 56 during steady-state operation. At time $T_1$, the LVRT event starts and the POC voltage signal 102 decreases. At time $T_2$, the controller 70 determines that the LVRT event started based at least in part on the first change to the input 66 of the load parameter. The controller 70 applies the eddy current brake 74 by discharging the supercapacitor 72 to send current to the inductors 78. As a result, the supercapacitor voltage signal 104 decreases while the inductor current signal 106 increases. Typically, when the voltage 104 of the supercapacitor 72 is high, a change rate of the electrical current 106 in the inductors 78 will also be high. Therefore, the inductor current signal 106 may increase electrical current up to a significant fraction 120 (e.g., approximately 90%) of its final value by time $T_3$. By time $T_4$, the inductor current signal 106 may increase to its final value. In some examples, the time period between time $T_2$ and $T_4$ may be between approximately 5 ms to 100 ms. After time $T_4$, the inductor current signal 106 may be operable at a steady state.

At time $T_5$, the LVRT event ends and the POC voltage signal 102 rises. At time $T_6$, the controller 70 determines that the LVRT event ended based at least in part on the second change to input 66 of the load parameter. The controller 70 disengages the eddy current brake 74 and directs the supercapacitor 72 to stop supplying current to the inductors 78. As a result, the inductor current signal 106 decreases. At or after time $T_6$, the controller 70 may control the low power charger 76 to recharge supercapacitor 72. As a result, the recharge current signal 108 increases at or after time $T_6$ and remains constant while the supercapacitor voltage signal 104 increases. At time $T_7$, the supercapacitor 72 is charged (e.g., fully charged) and the controller 70 directs the low power charger 76 to stop recharging the supercapacitor 72. As a result, the supercapacitor voltage signal 104 is at maximum or peak level and the recharge current signal 108 is at zero level. In some examples, the time period between time $T_6$ and $T_7$ may be between about 10 seconds to 20 minutes, 30 seconds to 10 minutes, or 60 seconds to 180 seconds.

Figure 4:
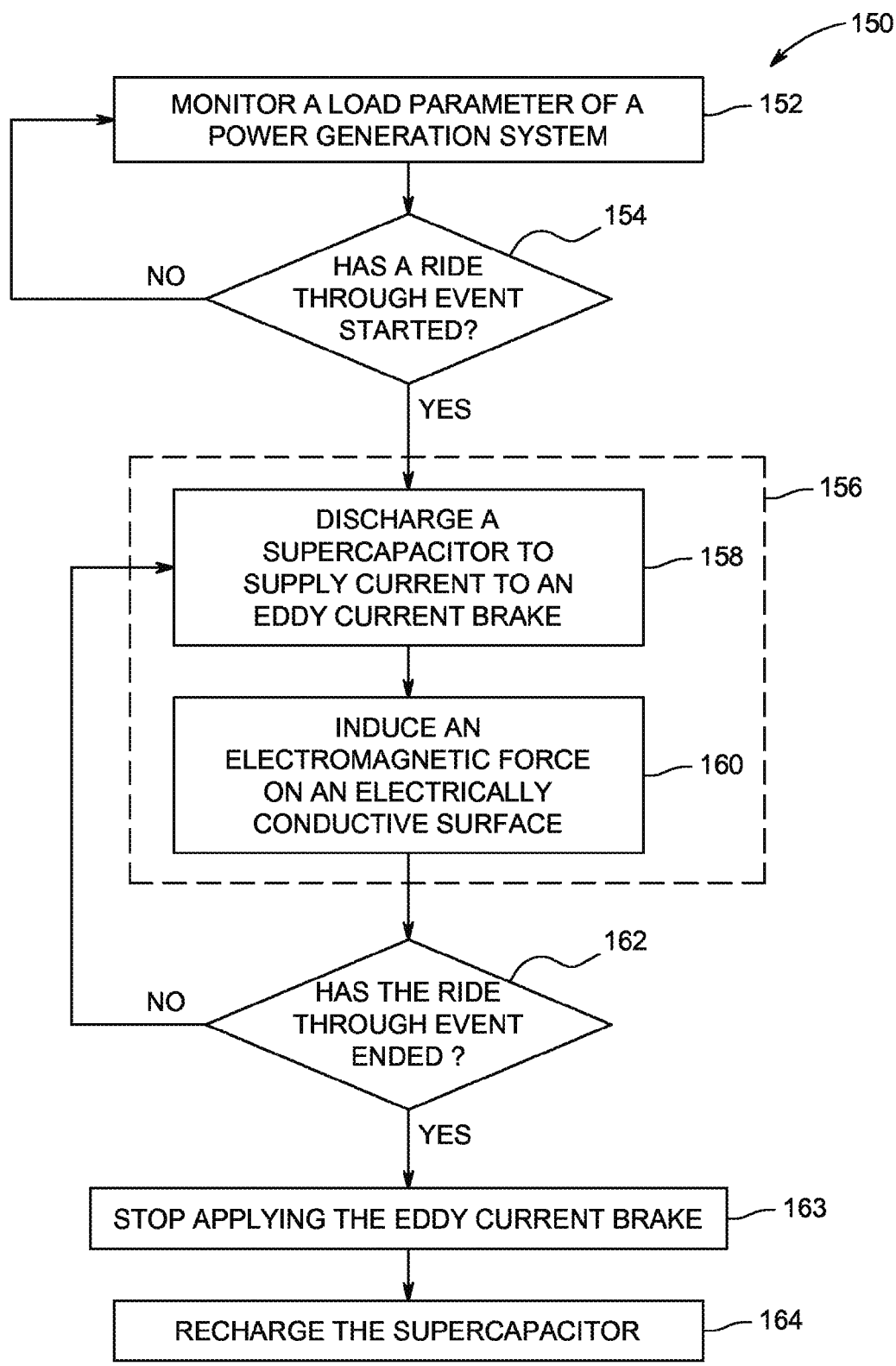
FIG. 4 is a flow chart illustrating a method of electromagnetic braking of a power generator of the power generation system during the LVRT event, in accordance with the present disclosure.

Referring to FIG. 4, a flow chart 150 illustrates a method for electromagnetic braking of the generator during the LVRT event, in accordance with the present disclosure. The controller 70 monitors (block 152) the one or more load parameters of the power generation system 50. The one or more load parameters 66 may include the rotational speed of the shaft 56 of the power generation system 50, the voltage coupled to the power generation system 50, the current through the power generation system 50, the mechanical power produced by the prime mover 54 of the power generation system 50, the rotor angle of the generator 60 of the power generation system 50, or the electrical power produced by the generator 60, or any combination thereof. Additionally, the controller 70 determines (node 154) the start of the LVRT event based at least in part on the first change to the load parameter 66. If the LVRT event has not started, then the controller 70 continues to monitor (block 152) the one or more load parameters. If the controller 70 determines (node 154) the LVRT event started, the controller 70 applies (block 156) the eddy current brake 74 to load the power generation system 50 through the LVRT event. Applying (block 156) the eddy current brake 74 includes discharging (block 158) the supercapacitor 72 to supply the threshold current to the eddy current brake 74 within the threshold time period of the start of the LVRT event. The threshold time period may be less than or equal to approximately 100 ms. Supplying the threshold current through at least one inductor 78 induces (block 160) an electromagnetic force on the electrically conductive surface 58 of the eddy current brake 74. In some embodiments, applying (block 156) the eddy current brake 74 to load the power generation system 50 for the duration of the LVRT event includes supplying the current from the supercapacitor 72 without receiving electrical power from a battery. The full duration of the LVRT event may be approximately 500 ms or less. The controller 70 determines (node 162) the end of the LVRT event based at least in part on a second change to the load parameter. If the controller 70 determines (node 162) that the LVRT event has not ended, then the controller continues to apply (block 156) the eddy current brake 74. If the controller 70 determines (node 162) that the LVRT event ended, the controller 70 may stop applying (block 163) the eddy current brake 74 and recharge (block 164) the supercapacitor 72, wherein recharging the supercapacitor 72 includes coupling the supercapacitor 72 to the power generation system 50 (e.g., generator 60) or to the grid 62 coupled to the power generation system 50.

Technical effects of the subject matter disclosed herein include, but are not limited to, electromagnetic braking of a generator of a power generation system during an LVRT event. It would be advantageous to reduce the response time of the electromagnetic brake as well as increase the duration of the application of the electromagnetic brake. As such, supplying energy to one or more windings of the inductors of the electromagnetic brake from a source that has a greater power density and energy density, such as a supercapacitor, would help to realize such advantages. Particularly, the power density of the supercapacitor reduces the response time of the electromagnetic brake powered by the supercapacitor, as compared to conventional batteries. The supercapacitor may also be charged to a significantly higher voltage than a minimum voltage used to operate the electromagnetic brake for a duration of the LVRT in order to allow a faster magnetization of the one or more windings of the inductors. Moreover, the maintenance costs associated with supercapacitors may be less than with conventional batteries. Additionally, the energy density of the supercapacitor increases the braking duration of the electromagnetic brake relative to using capacitors alone. Supercapacitors are attractive storage elements with the aforementioned features of combined high power and energy density and low maintenance effort. Other existing or future electrical storage elements with similar characteristics are within the spirit of the invention. Finally, a low power charger may be used to recharge the supercapacitor using current from a power grid or the power generation system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
an electromagnetic braking system, comprising:
an eddy current brake comprising an electrically conductive surface coupled to a shaft of a generator system, wherein the eddy current brake is configured to induce an electromagnetic force on the electrically conductive surface when powered; and
a supercapacitor coupled to the eddy current brake, wherein the supercapacitor is configured to discharge to power the eddy current brake for the duration of a ride through event of the generator system, and the supercapacitor is configured to supply a threshold current to the eddy current brake within approximately 100 ms of a start of the ride through event.

2. The system of claim 1, wherein the induced electromagnetic force on the electrically conductive surface is configured to maintain a rotational speed of the shaft below a threshold rotational speed.

3. The system of claim 1, wherein the ride through event comprises a low-voltage ride through event, wherein a first voltage coupled to the generator system during the low-voltage ride through event is less than 70 percent of a second voltage prior to the low-voltage ride through event.

4. The system of claim 1, comprising a charger coupled to the supercapacitor, wherein the charger is configured to charge the supercapacitor after an end of the ride through event.

5. The system of claim 1, wherein the supercapacitor comprises a power density of approximately 10 to 100 kW/kg and an energy density of approximately 1 to 5 Wh/kg.

6. The system of claim 1, comprising the generator system, wherein the generator system comprises the shaft, a prime mover coupled to the shaft, and a generator coupled to the shaft, wherein the generator is coupled to a power grid.

7. The system of claim 6, wherein the prime mover comprises a reciprocating engine.

8. The system of claim 1, comprising a controller coupled to the eddy current brake and the supercapacitor, wherein the controller is configured to determine the start of the ride through event and to discharge the supercapacitor to drive the eddy current brake upon determination of the start of the ride through event.

9. A system, comprising:
a controller coupled to a power generation system and an electromagnetic braking system, wherein the controller is configured to determine a start of a ride through event based at least in part on a load parameter of the power generation system and discharge a supercapacitor within a threshold time period of the start to drive the electromagnetic braking system to load the power generation system for a duration of the ride through event.

10. The system of claim 9, wherein the threshold time period is less than or equal to approximately 100 ms.

11. The system of claim 9, wherein the ride through event comprises a low-voltage ride through event, the load parameter comprises a voltage coupled to the power generation system, and the voltage is less than 70 percent of a steady-state voltage prior to the low-voltage ride through event.

12. The system of claim 9, wherein the controller is configured to determine an end of the ride through event, and the controller is configured to control a charger to recharge the supercapacitor after the end of the ride through event.

13. The system of claim 9, wherein the supercapacitor is charged to a higher voltage than a minimum voltage used to operate the electromagnetic brake for a duration of the ride through event.

14. The system of claim 9, wherein the controller is configured to engage a secondary loading system to load the power generation system or the controller is configured to shut down the power generation system if the duration of the ride through event is greater than approximately 1.5 seconds.

15. The system of claim 9, wherein the load parameter comprises a rotational speed of a shaft of the power generation system, a voltage coupled to the power generation system, a current through the power generation system, a mechanical power produced by a prime mover of the power generation system, a rotor angle of a generator of the power generation system, or an electrical power produced by the generator, or any combination thereof.

16. A method, comprising:
monitoring a load parameter of the power generation system;
determining a start of a ride through event based at least in part on a first change to the load parameter; and
applying an eddy current brake to load the power generation system through the ride through event, wherein applying the eddy current brake comprises:
discharging a supercapacitor to drive the eddy current brake within a threshold time period of the start of the ride through event, wherein discharging the supercapacitor comprises supplying at least a threshold current from the supercapacitor to the eddy current brake during the ride through event; and
inducing, via the current through at least one coil, an electromagnetic force on an electrically conductive surface of the power generation system.

17. The method of claim 16, comprising:
determining an end of the ride through event based at least in part on a second change to the load parameter; and
recharging the supercapacitor after the end of the ride through event, wherein recharging the supercapacitor comprises coupling the supercapacitor to the power generation system or to a power grid coupled to the power generation system.

18. The method of claim 16, wherein the load parameter comprises a rotational speed of a shaft of the power generation system, a voltage coupled to the power generation system, a current through the power generation system, a mechanical power produced by a prime mover of the power generation system, a rotor angle of a generator of the power generation system, or an electrical power produced by the generator, or any combination thereof.

19. The method of claim 16, wherein applying the eddy current brake to load the power generation system through the ride through event comprises supplying the current from the supercapacitor for a full duration of the ride through event without receiving electrical power from a battery.

20. The method of claim 16, wherein the threshold time period is less than or equal to approximately 100 ms.

* * * * *

UNITED STATES PATENT AND TRADEMARK OFFICE
CERTIFICATE OF CORRECTION

PATENT NO. : 9,537,301 B1
APPLICATION NO. : 14/821427
DATED : January 3, 2017
INVENTOR(S) : Schroeder et al.

Page 1 of 1

It is certified that error appears in the above-identified patent and that said Letters Patent is hereby corrected as shown below:

In the Specification

In Column 5, Line 52, delete "electromagnetic braking system 50" and insert -- electromagnetic braking system 52 --, therefor.

In Column 12, Lines 12-13, delete "electromagnetic braking system 50," and insert -- electromagnetic braking system 52, --, therefor.

In Column 12, Lines 30-31, delete "supercapacitor voltage signal 102" and insert -- supercapacitor voltage signal 104 --, therefor.

In Column 12, Line 45, delete "electrical current 106" and insert -- electrical current 116 --, therefor.

Signed and Sealed this
Sixth Day of June, 2017

Michelle K. Lee
*Director of the United States Patent and Trademark Office*